United States Patent
Maeda

(10) Patent No.: US 7,346,108 B2
(45) Date of Patent: Mar. 18, 2008

(54) ENCODED-DATA CONVERTING APPARATUS AND METHOD FOR THE SAME

(75) Inventor: Mitsuru Maeda, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1064 days.

(21) Appl. No.: 10/719,151

(22) Filed: Nov. 20, 2003

(65) Prior Publication Data

US 2004/0105501 A1 Jun. 3, 2004

(30) Foreign Application Priority Data

Nov. 29, 2002 (JP) ............................. 2002-348723

(51) Int. Cl.
*H04N 7/12* (2006.01)
(52) U.S. Cl. ................................. 375/240.16
(58) Field of Classification Search ................ 348/473, 348/469, 470, 441, 395.1, 403, 394, 402, 348/412, 430, 404, 699, 458, 512, 454; 382/232, 382/235, 236, 238, 239, 248, 250, 251, 234, 382/253, 100, 243; 375/240.12, 240.01, 375/240.26, 240.08, 240.13
See application file for complete search history.

(56) References Cited

U.S. PATENT DOCUMENTS 6,647,061 B1 * 11/2003 Panusopone et al. .. 375/240.12
6,999,512 B2 * 2/2006 Yoo et al. ............... 375/240.03
2002/0001348 A1 1/2002 Yiwen et al.

FOREIGN PATENT DOCUMENTS

JP 2001-238214 8/2001
JP 2001-238218 8/2001

* cited by examiner

*Primary Examiner*—Behrooz Senfi
(74) *Attorney, Agent, or Firm*—Canon U.S.A. Inc., I.P. Division

(57) ABSTRACT

An encoded-data converting apparatus and method are provided. First encoded data generated by using first encoding to encode image data is input. Header information included in the first encoded data is extracted. Header information based on second encoding is generated from the header information included in the first encoded data. Variable-length-code conversion is set up based on a predetermined parameter for use in the second encoding and an encoding parameter used in the first encoding. Encoded data in one frame is extracted from the first encoded data. A variable length code in the encoded data in the frame is converted in accordance with the variable-length-code conversion. DC components in the encoded data in the frame are decoded into quantized values and the quantized values are used to perform predictive encoding based on the second encoding. The obtained outputs are shaped and output as data encoded by the second encoding.

20 Claims, 9 Drawing Sheets

ENCODED-DATA CONVERTING APPARATUS AND METHOD FOR THE SAME

BACKGROUND OF THE INVENTION

1. Field of the Invention

The present invention relates to an encoded-data converting apparatus and method for efficiently converting data encoded by first encoding into data encoded by second encoding.

2. Description of the Related Art

In recent years, cameras have become digital, and some of them have begun to employ moving-picture encoding methods. For example, digital still cameras employ JPEG (Joint Photographic Experts Group) encoding in order to record still pictures. Also, Motion JPEG which performs video recording by consecutively encoding still pictures is becoming widely used.

In addition, with widespread use of personal computers, MPEG (Moving Picture Experts Group)-4 encoding, standardized by the International Organization for Standardization (ISO), has begun to be used as a method for exchanging and delivering video on the Internet.

MPEG-4 is an encoding method using inter-encoding, and is optimal for use on the Internet, etc., since it is suitable particularly for low bit rates, compared with conventional MPEG-1 and MPEG-2.

Similarly, it is desirable to use data encoded by Motion JPEG, for example, on the Internet similarly to an MPEG-4 bit stream.

Since Motion JPEG only uses intra-encoding without using inter-encoding, simply using Motion JPEG results in a data amount that is too large to be delivered on the Internet or the like.

Accordingly, a technique is required to convert Motion JPEG encoded data into an MPEG-4 bit stream. First, the Motion JPEG encoded data is temporarily decoded back to pixel level. Then, motion compensation may need to be performed, after which the stream must be re-encoded, thus requiring extensive encoding conversion processing. Also, the re-encoding may cause additional image deterioration in the re-encoded image data.

A technique of the related art for converting an MPEG-1 encoded bit stream into an MPEG-4 bit stream is disclosed in, for example, Japanese Patent Laid-Open No. 2001-238214. A technique of the related art for converting an MPEG-2 bit stream into an MPEG-4 bit stream is disclosed in, for example, Japanese Patent Laid-Open No. 2001-238218. However, a technique in which an encoding format only using intra-encoding without using inter-encoding, such as Motion JPEG, is converted into an encoding format using inter-encoding, such as MPEG-4, has not been proposed.

SUMMARY OF THE INVENTION

The present invention is made in view of the above circumstances, and it is an object of the present invention to provide an encoded-data converting apparatus for converting first encoded data into second encoded data at high speed and with a compact configuration without deteriorating image quality, and a method for the encoded-data converting apparatus.

According to an aspect of the present invention, an encoded-data converting apparatus is provided which includes an encoded-data input unit for inputting first encoded data generated by using first encoding to encode image data, a header extracting unit for extracting header information included in the first encoded data, a header generating unit for generating header information based on second encoding from the header information included in the first encoded data, a conversion setting unit for setting-up variable-length-code conversion based on a predetermined parameter for use in the second encoding and an encoding parameter used in the first encoding, a frame-data extracting unit for extracting encoded data in one frame from the first encoded data, a variable-length-code converting unit for converting a variable length code in the encoded data in the frame in accordance with the variable-length-code conversion set-up by the conversion setting unit, a DC-component converting unit for decoding DC components in the encoded data in the frame into quantized values and using the quantized values to perform predictive encoding based on the second encoding, and an encoded-data output unit for shaping the outputs of the header generating unit, the variable-length-code converting unit, and the DC-component converting unit into data, and outputting the data as data encoded by the second encoding.

According to another aspect of the present invention, an encoded-data converting method is provided which includes an input step for inputting first encoded data generated by using first encoding to encode image data, a header extracting step for extracting header information included in the first encoded data, a header generating step for generating header information based on second encoding from the header information included in the first encoded data, a conversion setting step for setting-up variable-length-code conversion based on a predetermined parameter for use in the second encoding and an encoding parameter used in the first encoding, a frame-data extracting step for extracting encoded data in one frame from the first encoded data, a variable-length-code converting step for converting a variable length code in the encoded data in the frame in accordance with the variable-length-code conversion set-up by the conversion setting step, a DC-component converting step for decoding DC components in the encoded data in the frame into quantized values and using the quantized values to perform predictive encoding based on the second encoding, and an encoded-data output step for shaping the outputs of the header generating step, the variable-length-code converting step, and the DC-component converting step into data, and outputting the data as data encoded by the second encoding.

Further objects, features and advantages of the present invention will become apparent from the following description of the preferred embodiments with reference to the attached drawings.

DESCRIPTION OF THE PREFERRED EMBODIMENTS

Embodiments of the present invention are described below with reference to the accompanying drawings.

First Embodiment

Figure 1:
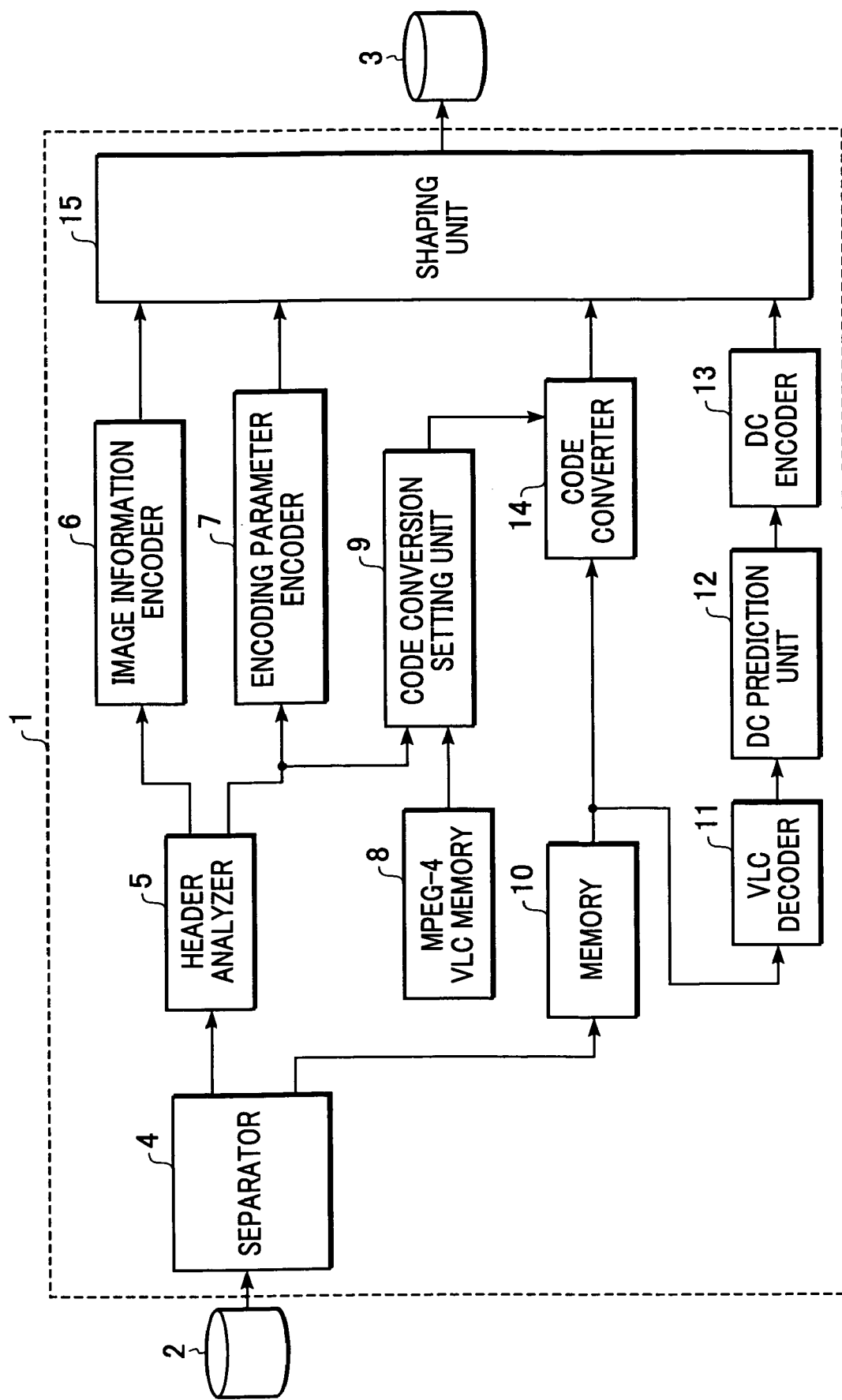
FIG. 1 is a block diagram showing an encoded-data converting system according to a first embodiment of the present invention.

FIG. 1 is a block diagram showing an encoded-data converting system according to a first embodiment of the present invention.

The encoded-data converting system in FIG. 1 consists of an encoded-data converting apparatus 1, and storage units 2 and 3. The storage unit 2 stores Motion-JPEG encoded data, for example, and the storage unit 3 stores MPEG-4 encoded data, for example. Although, in the first embodiment, the above encoding methods are described as examples, the present invention is not limited to the above encoding methods, but may be applied to an encoded-data converting system and method in which data encoded by intra-encoding is converted into data encoded by inter-encoding.

Referring to FIG. 1, a separator 4 interprets and separates Motion-JPEG encoded data into a header and encoded data in units of frames, and a header analyzer 5 interprets and separates the header into header image information describing an image itself, and parameters required for encoding. An image information encoder 6 encodes the header image information describing the image and creates a header based on another encoding scheme such as MPEG-4. An encoding parameter encoder 7 encodes the aforementioned parameters, and creates a header based on MPEG-4.

An MPEG-4 variable length code (VLC) memory 8 stores a variable-length-code encoding table for use in intra-macroblock encoding based on MPEG-4. A code conversion setting unit 9 generates a code conversion table using the parameters and the variable-length-code encoding table.

A memory 10 temporarily stores JPEG encoded data received from separator 4 into frames and sends the encoded data to a post stage in units of blocks. A VLC decoder 11 decodes variable length codes of DC components in each block. A DC prediction unit 12 performs prediction from surrounding DC components in accordance with a prediction method based on MPEG-4. Based on MPEG-4, a DC encoder 13 performs variable length encoding on prediction errors on the DC components obtained by the DC prediction unit.

Based on information in the conversion table generated by the code conversion setting unit 9, a code converter 14 converts the JPEG encoded data of AC components into MPEG-4 encoded data. A shaping unit 15 shapes the outputs of the image information encoder 6, the encoding parameter encoder 7, the DC encoder 13, and the code converter 14 into encoded data consistent with the MPEG-4 format.

A code converting process of the encoded-data converting system having the above configuration is described below.

Before performing the conversion, the components of the encoded-data converting system are initialized. Specifically, the memory 10 is cleared and parameters used in the components are reset. Also, in the storage unit 2, Motion-JPEG encoded data to be converted is selected and a start position at which the selected data is to be read is set. In the storage unit 3, a start position of writing into a writable area in unused areas is set.

When the initialization ends, Motion-JPEG encoded data is input from the storage unit 2 to the encoded-data converting apparatus 1. In the encoded-data converting apparatus 1, the separator 4 reads and separates the first JPEG encoded data item into encoded header data and encoded frame data. The encoded header data is stored in the header analyzer 5, and the encoded data in the frame is stored in the memory 10.

The header analyzer 5 interprets JPEG encoding headers. In JPEG encoding, initially, encoded data of an image layer is input. A detailed description of JPEG encoding is omitted since its details are described in the ISO 10918-1 standard. Various types of table data, are described, that follow a marker code representing the start of an image.

The table data is described because JPEG encoding does not have any default values concerning a quantization matrix and the Huffman table. The table data contains encoding parameters for encoding and decoding. The encoding parameters are input into the encoding parameter encoder 7.

In this case, an exemplary quantization matrix has 64 quantization table elements subsequent to a define quantization table (DQT) marker code defining the quantization table. Accordingly, the quantization table elements are read, or the quantization table elements are read in accordance with numbers of the quantization table. The read quantization table elements are input to the encoding parameter encoder 7. Also, regarding the Huffman table, Huffman codes follow a Define Huffman Table (DHT) marker code defining the Huffman table. The Huffman codes are read and input to the code conversion setting unit 9.

The encoding parameter encoder 7 compares the input quantization table elements and a default quantization matrix on an MPEG-4 intra-block.

A detailed description of the MPEG-4 standard is omitted here since its details are described in the ISO 14496-2 standard.

When the input quantization table elements differ from the default quantization matrix, the load_intra_quant_mat code of a video object layer (VOL) header is set to be 1, and a quantization table element of an AC component is described as a load_intra_mat code. Also, the vop_coding_type code of a video object plane (VOP) header is always set to be "00" representing intra-coded(I). An ac_pred_flag code describing whether AC prediction encoding in units of macroblocks is performed is set to be 0.

The code conversion setting unit 9 performs Huffman table processing. The following description takes, for instance, a case in which the Huffman table in JPEG is as described in table K.5 of Annex K of the ISO 10918-1 standard.

At first, codes whose run lengths are zeroes are partly extracted in the following Table 1.

TABLE 1

| RUN LENGTH | SIZE | CODE LENGTH | CODE |
|---|---|---|---|
| 0 | 1 | 2 | 00 |
| 0 | 2 | 2 | 01 |
| 0 | 3 | 3 | 100 |
| 0 | 4 | 4 | 1011 |
| 0 | 5 | 5 | 11010 |
| 0 | 6 | 7 | 1111000 |
| 0 | 7 | 8 | 11111000 |
| 0 | 8 | 10 | 1111110110 |
| 0 | 9 | 16 | 1111111110000010 |
| 0 | 10 | 16 | 1111111110000011 |

Also, the Huffman table in MPEG-4 encoding is uniquely set as described in Table B-16 of Annex B of the ISO 14496-2 standard, and its values are stored in the MPEG-4 VLC memory 8. The MPEG-4 encoding is a three-dimensional VLC method in which a variable length code is assigned to a set of (LAST, RUN, LEVEL), in contrast to two-dimensional Huffman coding.

For describing Huffman codes whose LAST are zeroes, codes whose run lengths are zeroes and whose LASTs are zeroes are partly shown in the following Table 2.

TABLE 2

| LAST | RUN | LEVEL | CODE LENGTH | CODE |
|---|---|---|---|---|
| 0 | 0 | 1 | 2 | 10 |
| 0 | 0 | 2 | 3 | 110 |
| 0 | 0 | 3 | 4 | 1111 |
| 0 | 0 | 4 | 5 | 01101 |
| 0 | 0 | 5 | 5 | 01100 |
| 0 | 0 | 6 | 6 | 010101 |
| 0 | 0 | 7 | 6 | 010011 |
| 0 | 0 | 8 | 6 | 010010 |
| 0 | 0 | 9 | 7 | 0010111 |
| 0 | 0 | 10 | 8 | 00011111 |

Also, since, when an EOB follows the Huffman codes input in JPEG encoding, LASTs are 1s, codes whose run lengths are 0s and whose LASTs are is are partly shown in the following Table 3.

TABLE 3

| LAST | RUN | LEVEL | CODE LENGTH | CODE |
|---|---|---|---|---|
| 1 | 0 | 1 | 4 | 0111 |
| 1 | 0 | 2 | 6 | 001100 |
| 1 | 0 | 3 | 8 | 00010110 |
| 1 | 0 | 4 | 9 | 000010111 |
| 1 | 0 | 5 | 10 | 0000000110 |
| 1 | 0 | 6 | 11 | 00000000101 |
| 1 | 0 | 7 | 11 | 00000000100 |
| 1 | 0 | 8 | 12 | 000001011001 |
| 1 | 0 | 9 | 12 | 000001100111 |
| 1 | 0 | 10 | 14 | 00000110001100 |

Here, in the case of (1, 0, 9) and (1, 0, 10), escape mode 1 is applied.

The MPEG-4 encoding has three escape modes.

In escape mode 1, after LMAX is subtracted from the absolute value of LEVEL of (LAST, RUN, LEVEL), three-dimensional VLC is used to perform variable length encoding (Esc+"0"+three-dimensional VLC). The value of LMAX is the maximum value of LEVEL corresponding to (LAST, RUN). This is shown in Table B-19 of Annex B of the ISO 14496-2 standard.

When the variable length encoding cannot be performed in escape mode 1, in escape mode 2, after the value (RMAX+1) is subtracted from RUN of (LAST, RUN, LEVEL), three-dimensional VLC is used to perform variable length encoding (Esc+"10"+three-dimensional VLC). The value of RMAX is the maximum value of RUN corresponding to (LAST, RUN). This is shown in Table B-21 of Annex B of the ISO 14496-2.

When variable length encoding cannot be performed even in escape mode 2, in escape mode 3, fixed length encoding (LAST: 1 bit; RUN: 6 bits; LEVEL: 12 bits) is performed (Esc+"11"+fixed length encoding).

TABLE 4

| | | JPEG | | MPEG-4 | |
|---|---|---|---|---|---|
| RUN LENGTH | SIZE | CODE LENGTH | CODE | CODE LENGTH | CODE |
| 0 | 1 | 2 | 00 | 2 | 10 |
| 0 | 2 | 2 | 01 | 3 | 110 |
| 0 | 3 | 3 | 100 | 4 | 1111 |
| 0 | 4 | 4 | 1011 | 5 | 01101 |
| 0 | 5 | 5 | 11010 | 5 | 01100 |
| 0 | 6 | 7 | 1111000 | 6 | 010101 |
| 0 | 7 | 8 | 11111000 | 6 | 010011 |
| 0 | 8 | 10 | 1111110110 | 6 | 010010 |
| 0 | 9 | 16 | 1111111110000010 | 7 | 0010111 |
| 0 | 10 | 16 | 1111111110000011 | 8 | 00011111 |

Also, when an EOB follows, a table for converting Huffman codes in JPEG encoding into Huffman codes in MPEG-4 encoding is created as shown in the following Table 5, based on the above Tables 1 and 3.

TABLE 5

| | | JPEG | | MPEG-4 | |
|---|---|---|---|---|---|
| RUN LENGTH | SIZE | CODE LENGTH | CODE | CODE LENGTH | CODE |
| 0 | 1 | 2 | 00 | 4 | 0111 |
| 0 | 2 | 2 | 01 | 6 | 001100 |
| 0 | 3 | 3 | 100 | 8 | 00010110 |

TABLE 5-continued

| | | JPEG | | MPEG-4 | |
|---|---|---|---|---|---|
| RUN LENGTH | SIZE | CODE LENGTH | CODE | CODE LENGTH | CODE |
| 0 | 4 | 4 | 1011 | 9 | 000010111 |
| 0 | 5 | 5 | 11010 | 10 | 0000000110 |
| 0 | 6 | 7 | 1111000 | 11 | 00000000101 |
| 0 | 7 | 8 | 11111000 | 11 | 00000000100 |
| 0 | 8 | 10 | 1111110110 | 12 | 000001011001 |
| 0 | 9 | 16 | 1111111110000010 | 12 | 000001100111 |
| 0 | 10 | 16 | 1111111110000011 | 14 | 00000110001100 |

By comparing the Huffman table in MPEG-4 encoding which is stored in the MPEG-4 VLC memory 8, the code conversion setting unit 9 similarly creates a conversion table for other Huffman codes. For brevity of description, a conversion table created when no EOB follows is hereinafter referred to as "conversion table A", and a conversion table created when an EOB follows is hereinafter referred to as "conversion table B". These conversion tables are input to the code converter 14.

Subsequently, the header analyzer 5 interprets the header of the first frame of the JPEG encoded data. The frame header includes image-related information such as a sampling precision of the input image, the number of lines, and the number of samples per line. These pieces of the information are input to the image information encoder 6.

Based on the above pieces of the information, the sampling precision of the input image, the number of lines, and the number of samples per line, the image information encoder 6 determines codes for use in MPEG-4 encoding. Regarding the sampling precision, in the case of 8 bits, the not_8_bit code of a VOL header is set to be 0, and in the case of not 8 bits, the not_8_bit is set to be 1. Then, by setting a quant_precision code and a bits_per_pixel code, as required, codes are generated.

Since the number of lines and the number of samples per line represent the vertical and horizontal sizes of the image, respectively, the values of both are set in the video_object_layer_height code and video_object_layer_width code of the VOL header, whereby codes are generated. Obviously, the shape of the image is rectangular. Thus, a video_object_layer_shape code is set to "rectangular". By setting other codes in MPEG-4 encoding, a visual object sequence (VOS) header and a visual object (VO) header, and a vol header, as required, codes are generated. The generated codes are input to the shaping unit 15. The shaping unit 15 shapes the input codes into header data, that is, VOS (visual object sequence), VO (visual object), and VOL (video object layer), and stores the shaped data in a predetermined area of the storage unit 3.

The encoded data in the frame, separated in the separator 4, is stored in the memory 10. Its DC components are input in units of blocks to the VLC decoder 11, and its AC components are input in units of blocks to the code converter 14.

DC component processing is now being described below.

The VLC decoder 11 decodes DC component codes and inputs prediction error values of quantized DC components to the DC prediction unit 12. Using DC components of the previous block and the input prediction error values, the DC prediction unit 12 restores and stores quantized values of DC components, and DC components in MPEG-4 encoding are predicted based on DC components of surrounding blocks.

Based on a DC component in a block in the same position on an adjacent line and a DC component of an adjacent block, a predicted DC error is found and input to the DC encoder 13.

The DC encoder 13 generates a code by encoding the input predicted DC error in accordance with a DC component encoding process based on MPEG-4. The generated code is input to the shaping unit 15.

Also, the code converter 14, into which the AC component code is input, performs conversion in accordance with the conversion table generated by the code conversion setting unit 9. When no EOB follows the read Huffman codes, the code converter 14 performs conversion into Huffman codes in MPEG-4 encoding, in accordance with conversion table A, for example. When an EOB follows, the code converter 14 performs conversion in accordance with conversion table B, for example, and proceeds to processing of the next block. The generated code is input to the shaping unit 15.

The codes, generated by the image information encoder 6, the encoding parameter encoder 7, the DC encoder 13, and the code converter 14, are rearranged in MPEG-4 encoding format by the shaping unit 15. The rearranged codes are output and sequentially written in predetermined areas of the storage unit 3.

The above-described process is performed for all the frames of the JPEG encoded data stored in the storage unit 2. Frame-data reading and code conversion are performed, and the conversion results are output before terminating the encoded-data converting process.

The above-described encoded-data converting process is described below with reference to the flowcharts shown in FIGS. 2 and 3.

Figure 2:
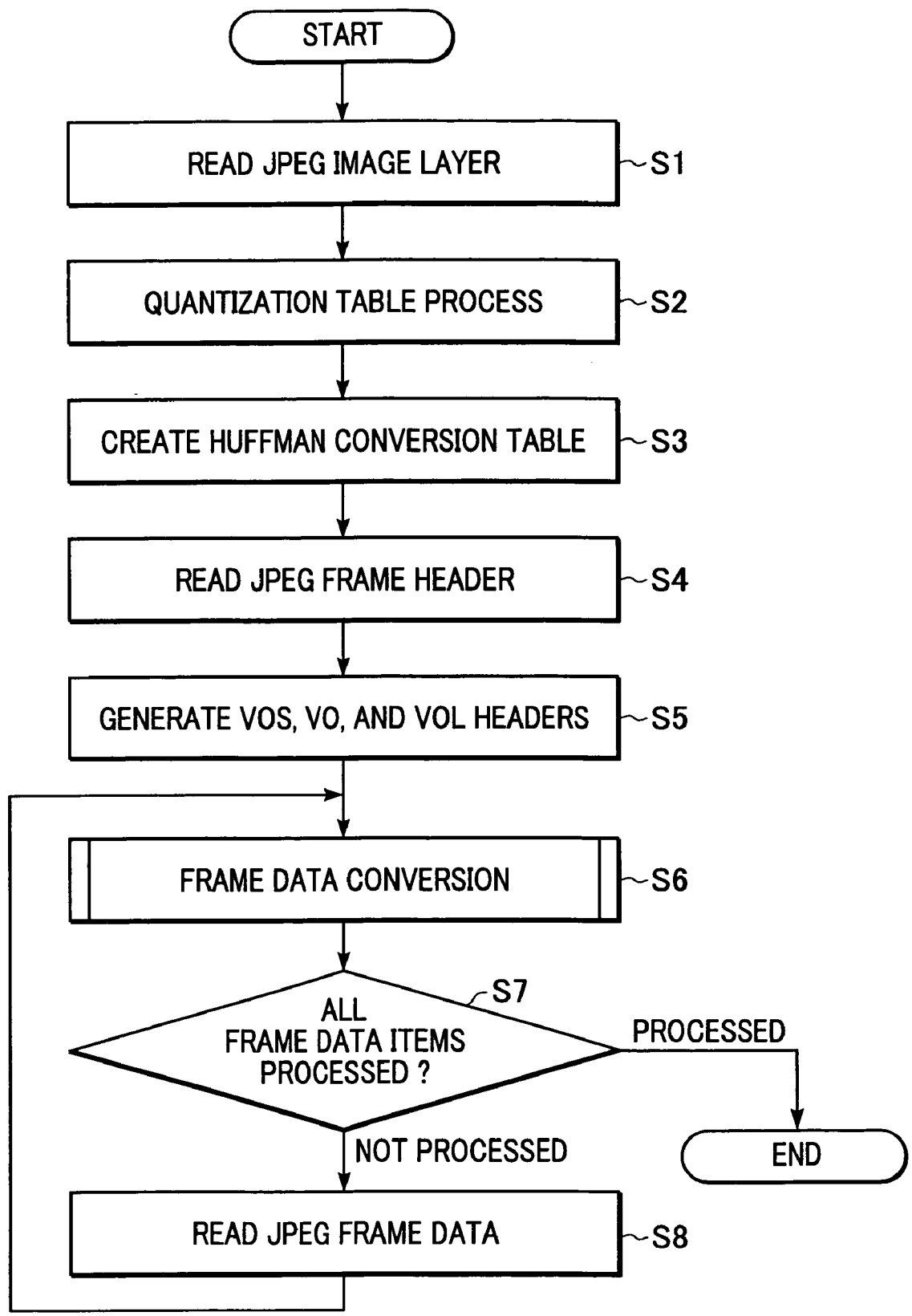
FIG. 2 is a flowchart showing an encoded-data converting process according to the first embodiment of the present invention.

FIG. 2 is a flowchart showing an encoded-data converting process performed in the first embodiment of the present invention.

Referring to FIG. 2, in step S1, encoded data of an image layer such as JPEG encoded data is read.

In step S2, from the encoded data, codes on a quantization table are extracted and compared to a quantization matrix based on MPEG-4 encoding, and codes are generated, if required.

In step S3, by extracting and comparing Huffman-table-related codes with a Huffman table based on MPEG-4 encoding, a conversion table is created.

In step S4, frame data is read from the JPEG encoded data and is analyzed.

In step S5, from the result of the analysis, etc., image information is obtained, and VOS, VO, and VOL header data items are created and output.

In step S6, encoded data concerning pixels in the frame is converted. The conversion process is described later with reference to the flowchart shown in FIG. 3.

In step S7, it is determined whether all the frame data items have been processed. When there is an unprocessed frame data item, the process proceeds to step S8.

In step S8, JPEG-encoded frame data is read. Returning to step S6, the frame data is converted. In step S7, if the process has determined that all the frame data items have been processed, the process is terminated.

Figure 3:
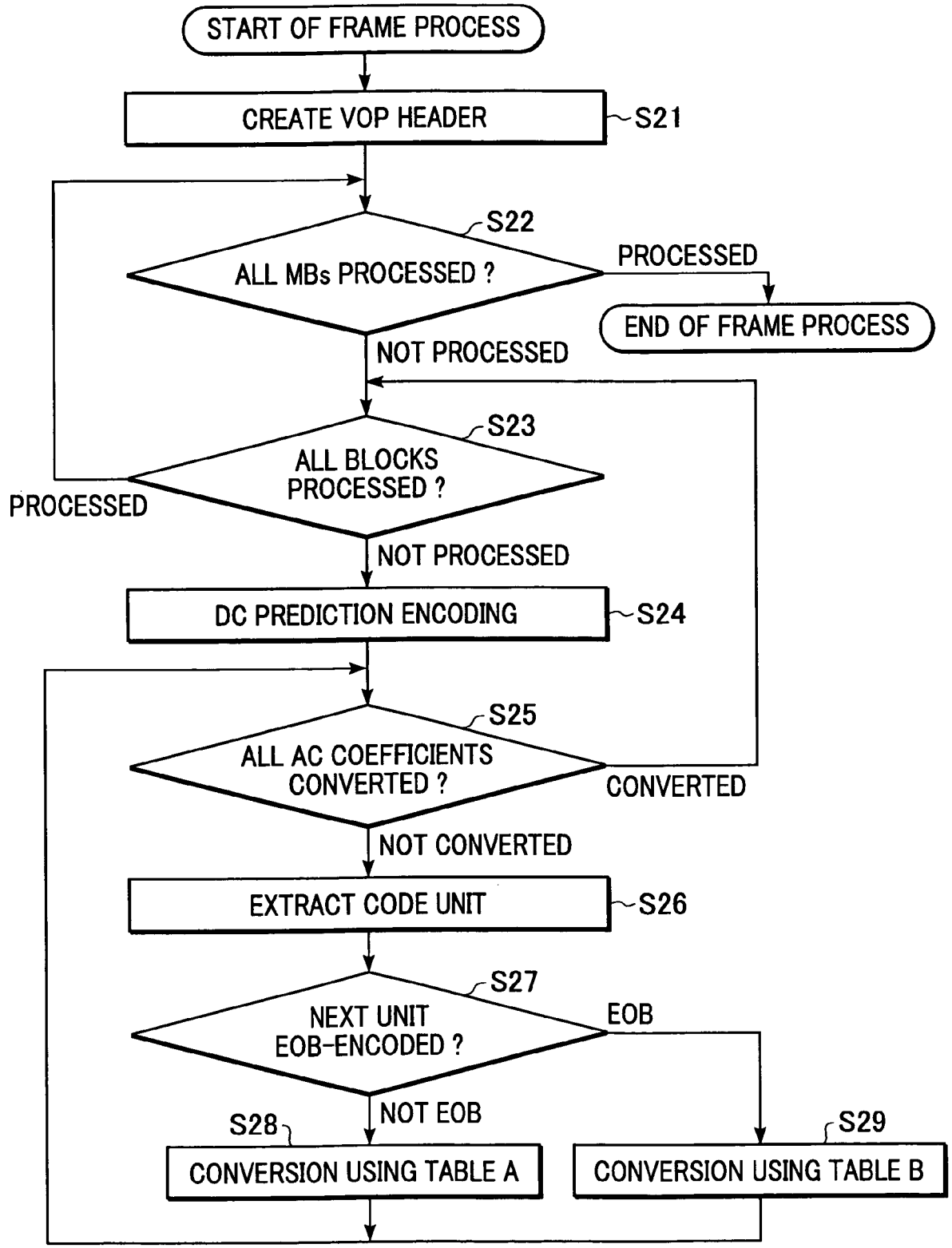
FIG. 3 is a flowchart showing an encoded-data converting process in units of frames according to the first embodiment of the present invention.

FIG. 3 is a flowchart showing the encoded-data converting process in units of frames, which is shown in step S6 of FIG. 2.

In FIG. 3, in step S21, a VOP header is created from the image information, etc., and is output.

In step S22, termination determination is performed by determining whether or not all the macroblocks of the frame have been processed. If the macroblocks have been processed, the process is terminated. If not, the process proceeds to step S23.

In step S23, it is determined whether or not all the blocks of the macroblocks have been processed. If the blocks have been processed, the process returns to step S22. If not, the process proceeds to step S24.

In step S24, for a DC component in the block, decoding on a prediction error is performed. In addition, reproduction of a quantized value of the DC component based on prediction in JPEG, and prediction and encoding in MPEG-4 encoding are performed. The obtained result is output.

In step S25, by detecting an EOB code, it is determined whether or not all AC components have been converted. This determines termination of processing in units of blocks. If all the AC components have been converted, the process returns to step S23. If not, the process proceeds to step S26. In step S26, a Huffman code representing a run length of zero is extracted.

In step S27, it is determined whether or not a code next to the extracted code is an EOB. When the code next to the extracted code is not an EOB, the process proceeds to step S28. In step S28, the code is converted by using Table A and is output. In step S29, the code is converted by using Table B.

As described above, according to the first embodiment, data encoded by a first encoding scheme such as, JPEG encoding, can be converted into data (I-VOP) encoded by a second encoding scheme such as MPEG-4 encoding. Among other advantages, such conversion can be obtained without reproducing pixel levels and without deterioration. Further yet, compared with JPEG encoding, adaptive prediction of the DC component is performed in MPEG-4 encoding. Thus, it is expected that the encoding efficiency increases. Also, very high speed processing can be performed since tables are used to perform code conversion. Moreover, the need for a memory for storing pixel levels is eliminated. Accordingly, complexity of processing can be reduced, thus enabling a reduction in apparatus cost.

Second Embodiment

A second embodiment of the present invention is described below.

Figure 4:
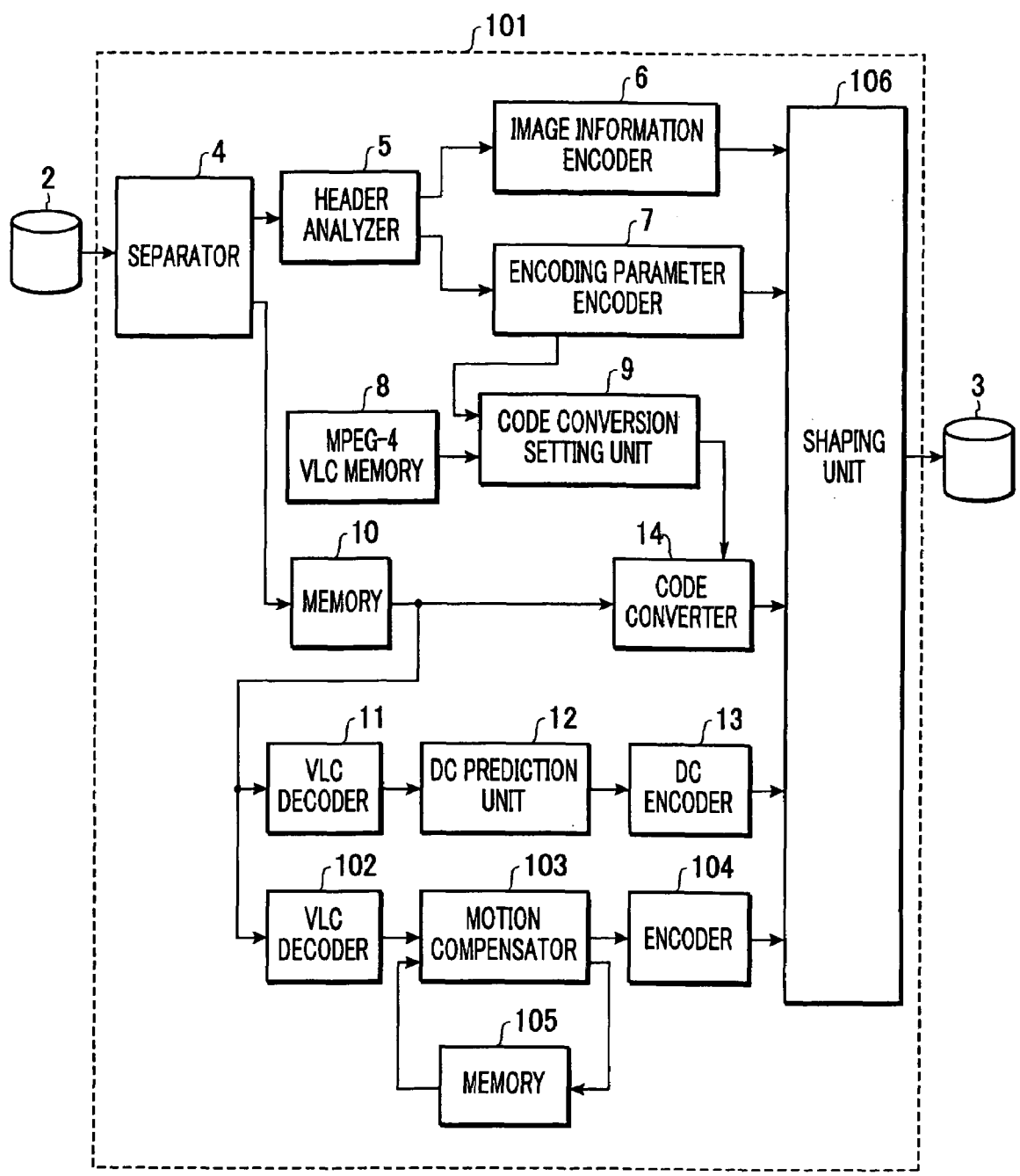
FIG. 4 is a block diagram showing an encoded-data converting system according to a second embodiment of the present invention.

FIG. 4 is a block diagram showing an encoded-data converting system according to the second embodiment of the present invention. Also, in the second embodiment, a case in which Motion-JPEG encoded data is an input and MPEG-4 encoded data is an output is described. However, that the present invention is not limited to the above case is similar to the first embodiment. In FIG. 4, by denoting components identical to those in FIG. 1 showing the first embodiment by identical reference numerals, a detailed description of each component is omitted.

FIG. 4 shows an encoded-data converting apparatus 101 according to the second embodiment. The encoded-data converting apparatus 101 includes a VLC decoder 102 for decoding a variable length code of an AC component in each block, and a motion compensator 103 for performing motion compensation in units of macroblocks by using quantized values.

An encoder 104 encodes a prediction error of a macroblock, and motion vectors which are obtained by the motion compensator 103, into a variable length code in accordance with MPEG-4 encoding. A memory 105 stores quantized values for each block. A shaping unit 106 shapes the outputs of an image information encoder 6, an encoding parameter encoder 7, a DC encoder 13, a code converter 14, and an encoder 104 into encoded data complying with the MPEG-4 format.

Code conversion of the encoded-data converting system having the above-described configuration is described below.

Before performing the conversion, the components of the encoded-data converting system are initialized. Specifically, the memory 10 and the memory 105 are cleared and parameters used in the components are reset. Also, in the storage unit 2, Motion-JPEG encoded data to be converted is selected and a start position at which the selected data is read is set. In the storage unit 3, a start position of writing into a writable area in unused areas is set.

When the initialization ends, Motion-JPEG encoded data is input from the storage unit 2 to the encoded-data converting apparatus 101. In the encoded-data converting apparatus 101, the separator 4 reads and separates the first JPEG encoded data item into a header and encoded data in units of frames. The header is stored in the header analyzer 5, and the encoded data in the frames is stored in the memory 10.

Similarly to the first embodiment, the header analyzer 5 interprets the JPEG headers and extracts encoding parameters and image information. An encoding parameter encoder 7 and the image information encoder 6 create and output header data to the shaping unit 106. A code conversion setting unit 9 creates and inputs a conversion table to a code converter 14.

Next, frame-unit processing is described below. In the second embodiment, I-VOP representing an in-frame encoding mode in the MPEG-4 encoding, and P-VOP representing an interframe encoding modes are generated. Although the following description is directed to a case in which I-VOP is included at regular intervals, the case has no limitation caused by intervals and frame-mode determination.

At first, a case in which the encoding mode in the frame is I-VOP is described below. In the encoding parameter encoder 7, the vop_coding_type code of a VOP header is set to be "00" representing intra-coded(I). Similarly to the first embodiment, the frame data in the frame, separated by the separator 4, is stored in the memory 10. DC components are input in units of blocks to the VLC decoder 11 and the VLC decoder 102, and AC components are input to the code converter 14 and the VLC decoder 102.

Conversion of the codes of the DC components is performed by the VLC decoder 11, the DC prediction unit 12, and the DC encoder 13, similarly to the first embodiment.

Also, conversion of the AC components is performed by the code converter 14, similarly to the first embodiment. The converted encoded data is output through the shaping unit 106.

Regarding encoded data input from the memory 10 to the VLC decoder 102 in units of blocks, the DC components and the AC components are decoded into variable length data, and quantized values are reproduced and input to the motion compensator 103. The motion compensator 103 does not operate based on I-VOP, and the quantized values are directly stored in the memory 105. The encoder 104 also does not operate based on I-VOP.

Next, a case in which the encoding mode in the frame is P-VOP is described below.

The encoding parameter encoder 7 sets the vop_coding_type of the VOP header to be "01" representing predictive-coded(P). The encoded data in the frame, stored in the memory 10, is read in units of blocks and is input to the VLC decoder 102. For each of DC components and AC components, variable length data is decoded and quantized values are reproduced and input to the motion compensator 103. The motion compensator 103 compares the input quantized values and the quantized values stored in units of blocks in the memory 105. The comparison may be performed only for, for example, luminance. In addition, chromaticity may be added in the comparison.

Motion compensating processing of the motion compensator 103 is described below.

Although the following description is directed to a case in which an image has a format of CIF (352 by 288), definitely, the image format is not limited to this case.

It is assumed that an input block has coordinates (I, J) in an image and a quantized value is represented by G(x, y), where I represent a value of 0 to 21, and J represents a value of 0 to 17. For a quantized value $Pi,j(x,y)(i=0$ to 21, $j=0$ to 17), the sum of the absolute values of differences is calculated in accordance with the following expression:

$$Sij = \Sigma_{x=0,7} \Sigma_{y=0,7} |G(x,y) - Pi,j(x,y)| \quad (1)$$

Also, with four input blocks treated as a macroblock unit, each Sij is collectively treated, the sums of the absolute values of differences are found for macroblocks, and the least sum of the sums is selected. This causes the state of the image to be equivalent to a state in which motion compensation in units of eight pixels is performed. A relative position with respect to the selected block is used as a motion vector, and a difference therefrom is output as a prediction error to the encoder 104. As mentioned above, in the second embodiment, the motion vector is treated in units of 16 pixels. In addition, by selecting the inter-4MV mode which sets a motion vector for each block, motion compensation for each block may be performed. In this case, 8-pixel-precision motion compensation can be performed.

The encoder 104 encodes the motion vector and the prediction error between the quantized values. The obtained encoded data is input to the shaping unit 106.

When the encoding mode in the frame is I-VOP, the shaping unit 106 rearranges the codes generated by the image information encoder 6, the encoding parameter encoder 7, the DC encoder 13, and the code converter 14 in accordance with the MPEG-4 format.

Also, when the encoding mode in the frame is P-VOP, the shaping unit 106 rearranges the codes generated by the image information encoder 6, the encoding parameter encoder 7, and the encoder 104 in accordance with the MPEG-4 format. The rearranged codes are output to the storage unit 3 and are sequentially written in predetermined areas.

Frame data of all the frames of the JPEG encoded data stored in the storage unit 2 is read and converted. After the data is output before the process is terminated.

The flow of the above encoded-data converting process is described below with reference to the flowcharts shown in FIGS. 5 and 6.

Figure 5:
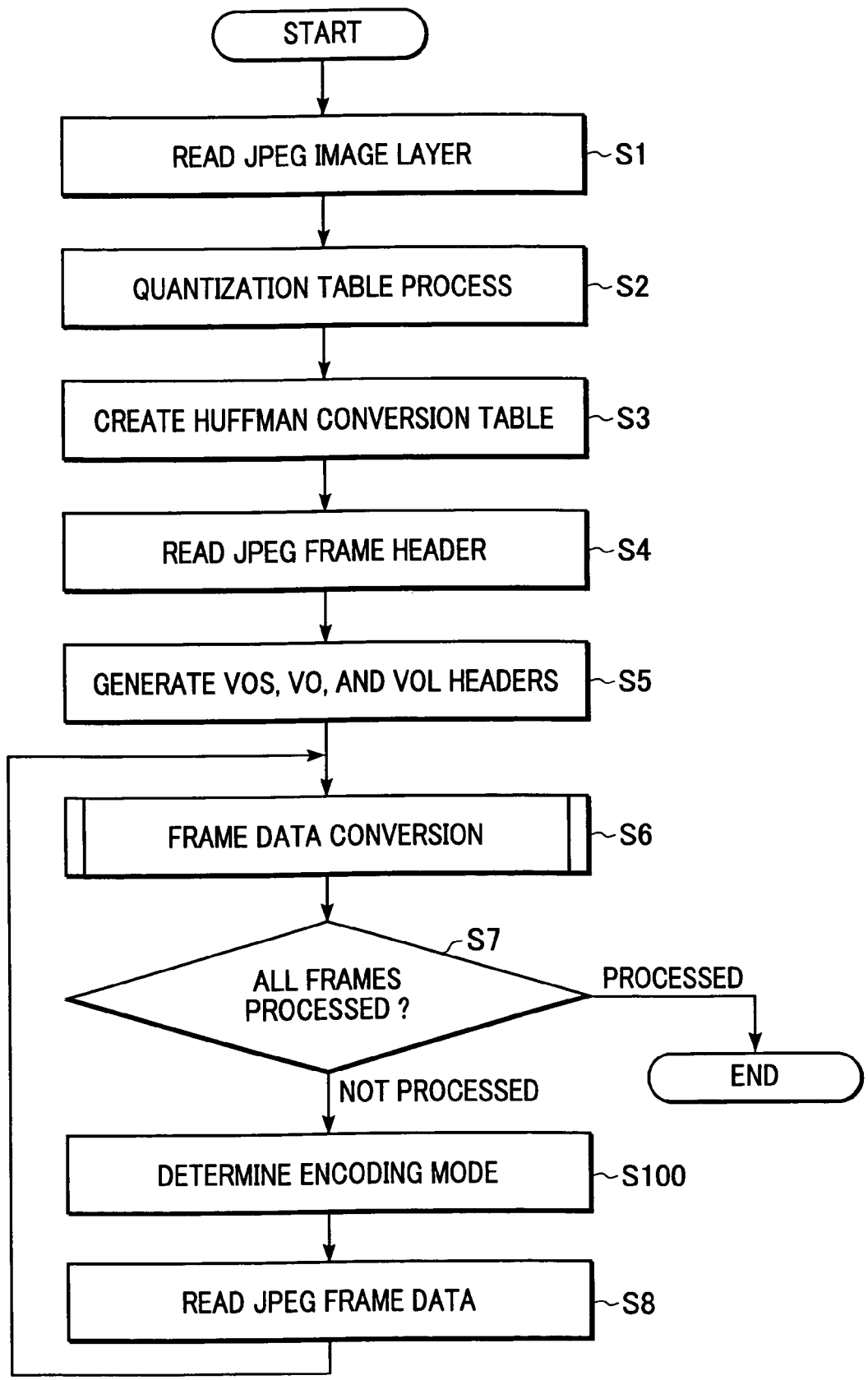
FIG. 5 is a flowchart showing an encoded-data converting process according to the second embodiment of the present invention.

FIG. 5 is a flowchart showing an encoded-data converting process in the second embodiment. By denoting steps identical to those in the above first embodiment by identical reference numerals, a detailed description of each step is omitted.

When it is determined in step S7 that there is unprocessed frame data, the process proceeds to step S100. In step S100, the process determines one of I-VOP and P-VOP as the encoding mode. For example, the encoding mode may be determined so as to be I-VOP at regular intervals. After that, in step S8, frame data is read similarly to the first embodiment. Returning to step S6, the code of the frame data is converted in accordance with the encoding mode.

Figure 6:
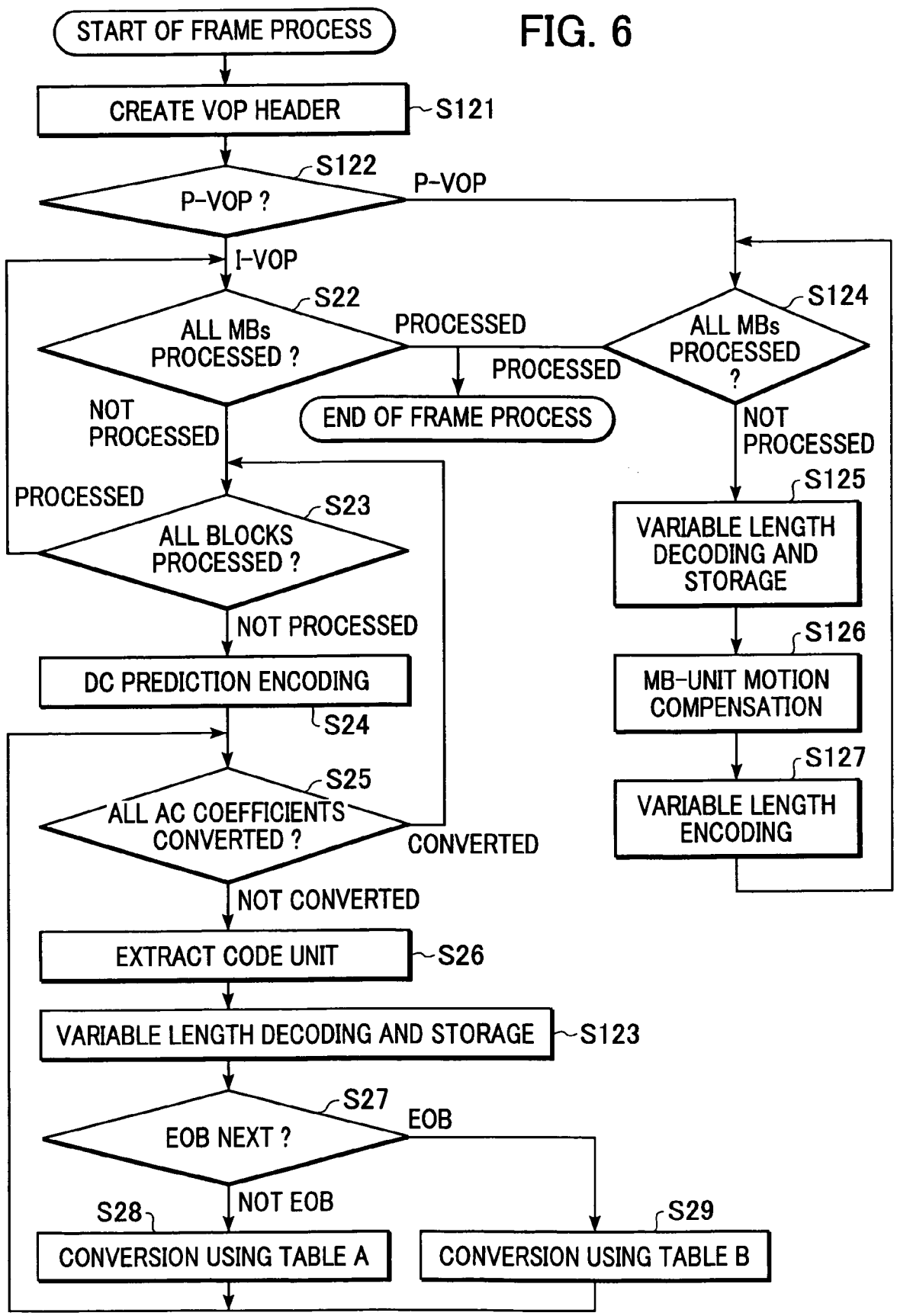
FIG. 6 is a flowchart showing an encoded-data converting process in units of frames according to the second embodiment of the present invention.

FIG. 6 is a flowchart showing a process for the encoded data conversion in units of frames in step S6 in FIG. 5. By denoting steps identical to those in the first embodiment by identical reference numerals, a detailed description of each step is omitted.

In step S121, from the image information, etc., a VOP header is created and output. At this time, a vop_coding_type code is set to be "00" when the I-VOP encoding is selected in step S100 in FIG. 5, and is set to be "01" when the P-VOP encoding is selected.

In step S122, a processing type is selected depending on the encoding mode determined in step S100 in FIG. 5. When the encoding mode is I-VOP, the process proceeds to step S22, and when the encoding mode is P-VOP, the process proceeds to step S124.

When the encoding mode is I-VOP, steps S24 to S26 are performed before the process proceeds to step S123. In step S123, a quantized value is obtained by decoding DC-component and AC-component variable length data and is stored in the memory 105. After that, similarly to the first embodiment, AC-component conversion is performed in steps S27 to S29.

When the encoding mode is P-VOP, in step S124, termination determination is performed similarly to step S22. When all the macroblocks have not been processed yet, in step S125, a quantized value is obtained by decoding DC-component and AC-component variable length data in one macroblock, and is stored in the memory 105. The process proceeds to step S126.

In step S126, motion vector retrieval and prediction error calculation are performed by referring to the quantized value. In step S127, the obtained motion vector and prediction error are encoded by MPEG-4 encoding and are output. The process returns to step S124 in order to process the next macroblock.

As described above, according to the second embodiment, data encoded by JPEG encoding, which is an in-frame encoding method, can be converted into data (I-VOP and P-VOP) encoded by MPEG-4 encoding, which is an inter-frame encoding method, without reproducing pixel levels and deterioration. As a result, compared with JPEG encoding, it is expected that, in MPEG-4 encoding, motion compensation greatly increases the encoding efficiency. Also, very high speed processing can be performed since code conversion can also be performed by referring to tables. It is not necessary to use a memory for storing pixel levels. Thus, the configuration required for processing can be reduced, thus enabling a reduction in apparatus cost. Moreover, the motion vector retrieval requires a very small number of arithmetic operations, thus enabling a reduction in apparatus cost. In addition, the motion vector retrieval requires a very small number of arithmetic operations, thus enabling high speed retrieval.

Third Embodiment

A third embodiment of the present invention is described below. The third embodiment shows an example of the encoded-data converting process which is realized by software.

Figure 7:
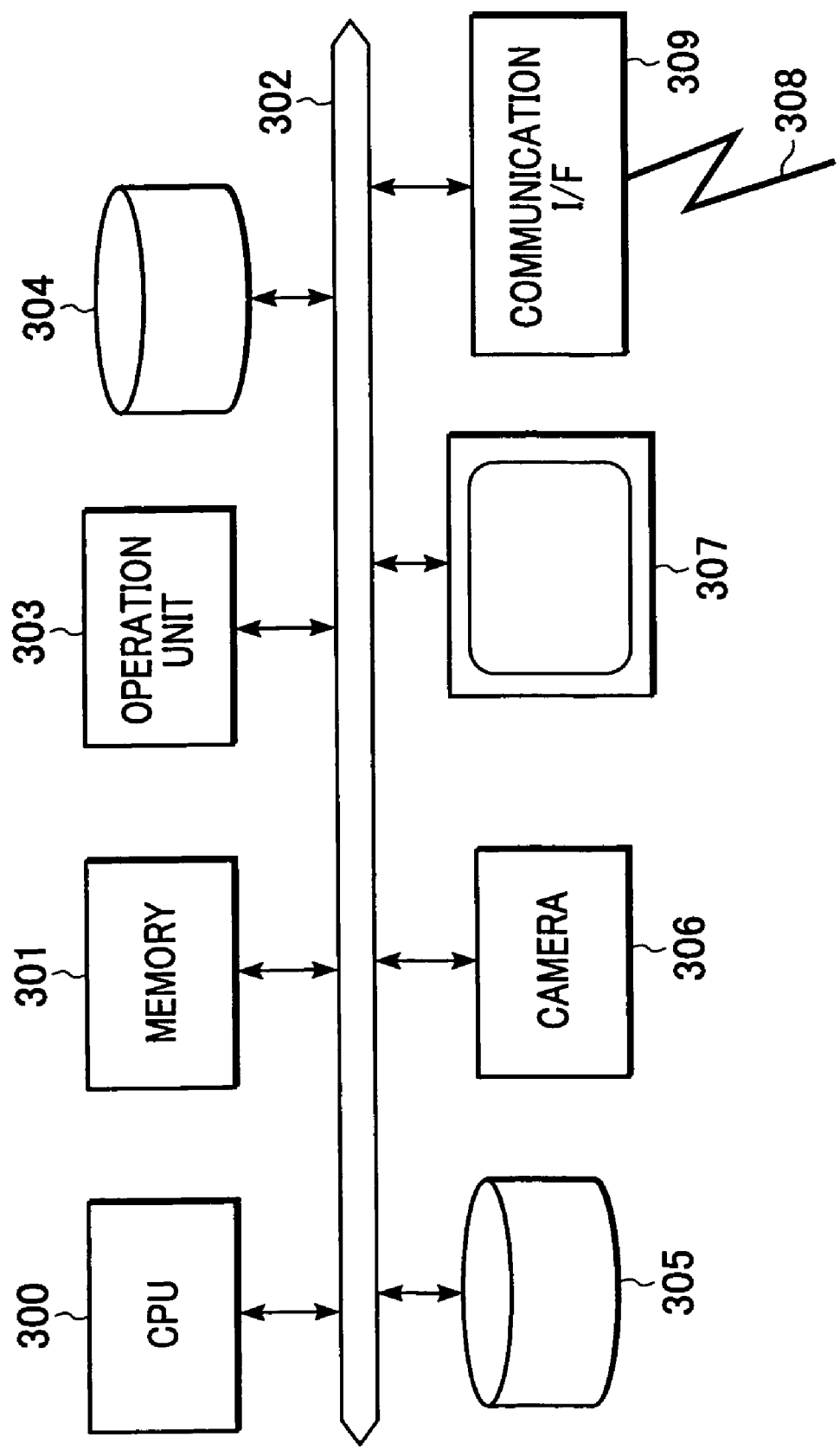
FIG. 7 is a block diagram showing an encoded-data converting system according to the third embodiment.

FIG. 7 is a block diagram showing an encoded-data converting apparatus in the third embodiment.

Referring to FIG. 7, a central processing unit (CPU) 300 controls the entirety of the encoded-data converting apparatus, and a memory 301 provides the storage area required for arithmetic operations by an operating system (OS) necessary for the apparatus control and by software.

The apparatus includes a bus 302 for connecting various types of devices and exchanging data and control signals, an operation unit 303 for starting the apparatus, setting various conditions, and commanding playback, and a storage unit 304 for storing software.

Also, a storage unit 305 stores image data, and a camera 306 captures images. Storage units 304 and 305 may also be formed by media which is removable from the system. The apparatus also includes a monitor 307 for displaying an image, a communication link 308 including a local area network, a public circuit, a wireless link, airwaves, etc., a communication interface (I/F) 309 for transmitting/receiving image data through the communication link 308.

In the memory 301, the OS for operating various types of software, and software to be operated are stored. The memory 301 includes a JPEG encoded data area for storing input JPEG encoded data, an MPEG-4 encoded data area for storing MPEG-4 encoded data to be output, and a working area for storing parameters, etc., such as quantized values obtained by decoding.

An encoded data transmitting process in which, in the above configuration, Motion-JPEG encoded data stored in the storage unit 305 is converted into MPEG-4 encoded data and is transmitted is described below.

Before the encoded data transmitting process is performed, the operation unit 303 instructs the entirety of the apparatus to start, and each component of the apparatus is initialized. Then, the software stored in the storage unit 304 is loaded into the memory 301 through the bus 302, whereby the software is started.

Figure 8:
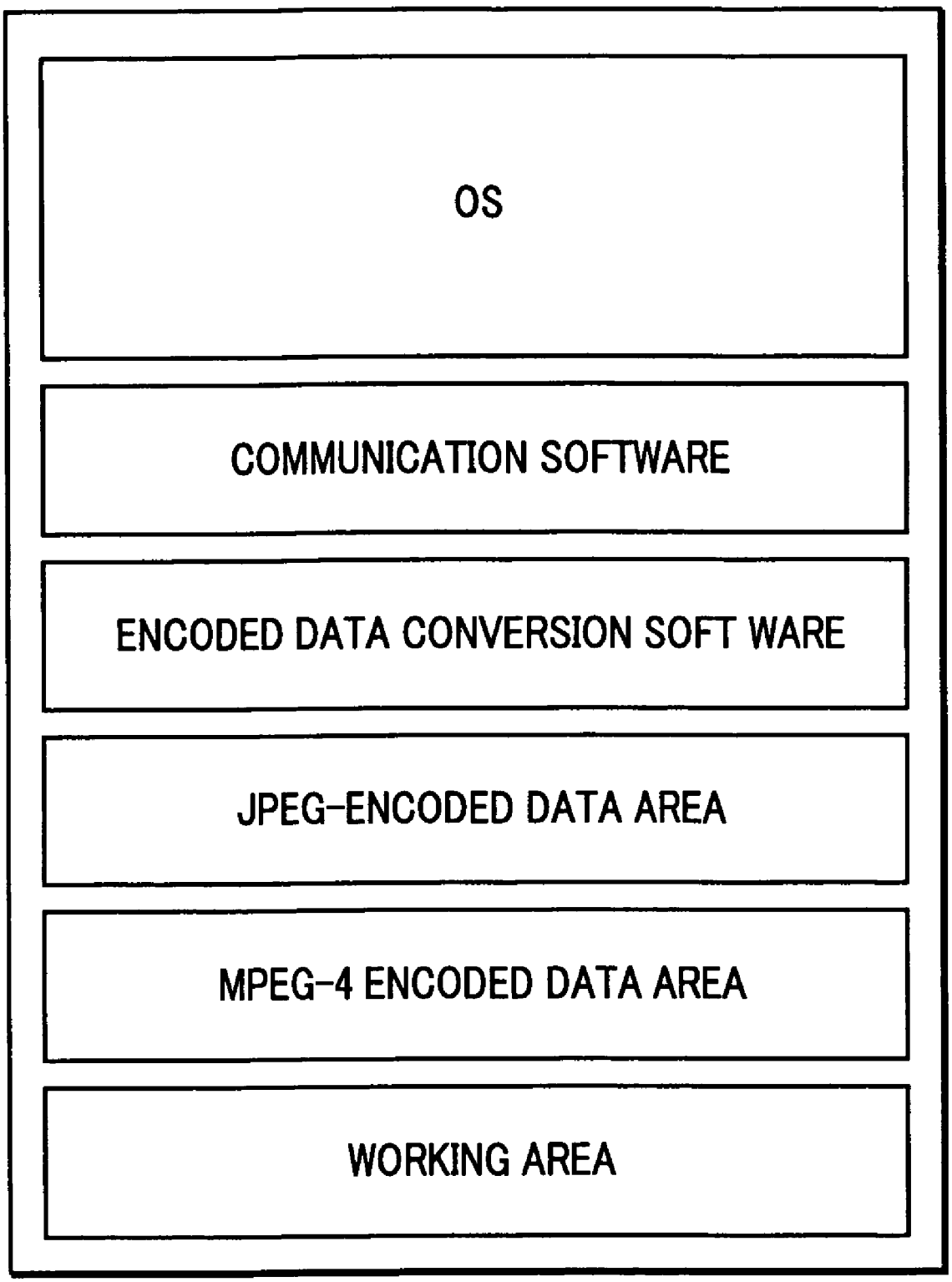
FIG. 8 is an illustration of an example of the use of the memory according to the third embodiment of the present invention.

FIG. 8 shows a state in which the memory 301 is used. As shown in FIG. 8, in the memory 301, the OS for controlling the entirety of the apparatus and operating the types of software, communication software for controlling communication, and encoded-data converting software are loaded.

After the apparatus is started, the communication software in the memory 301 is started to establish a communication path with another apparatus through the communication link 308.

Encoded data conversion by the CPU 300 is described below. The second embodiment shown in FIG. 5 applies to image-information extraction, encoding-parameter extraction, image-information encoding, encoding-parameter encoding, and creation of a header for MPEG-4 encoded data. Accordingly, the third embodiment is described with reference to FIG. 5.

In step S1, encoded data of an image layer of JPEG encoded data is read and stored in the JPEG encoded data area of the memory 301.

In step S2, from the encoded data of the image layer stored in the JPEG encoded data area of the memory 301, a code, which is an encoding parameter relating to a quantization table, is extracted and compared with an MPEG-4 encoding quantization matrix. A code is generated, as required, and is stored in the working area.

In step S3, from the encoded data in the JPEG encoded data area of the memory 301, a code relating to the Huffman table is extracted and is compared with an MPEG-4 Huffman table. A conversion table is created and stored in the working area.

In step S4, from the JPEG encoded data in the JPEG encoded data area of the memory 301, frame data is read and its header is analyzed. The obtained image information is stored in the working area of the memory 301.

In step S5, VOS, VO, and VOL header data items are created from the image information and encoding parameters, etc., and are stored in the MPEG-4 encoded data area of the memory 301.

In step S6, encoded data of pixels in the frame is converted.

In step S7, it is determined whether all the frame data items have been processed. When there is an unprocessed frame data item in the JPEG encoded data area of the memory 301, the process proceeds to step S100.

In step S100, it is determined which of I-VOP and P-VOP is the encoding mode.

In step S8, JPEG encoded frame data is read from the JPEG encoded data area of the memory 301.

In step S6, encoded data of pixels in the frame is performed and the converted data is sequentially stored in the MPEG-4 encoded data area. After that, the process proceeds to step S7. This conversion is described later with reference to FIG. 9.

When it is determined in step S7 that all the frame data items have been processed, the process is terminated. The encoded data in the MPEG-4 encoded data area of the memory 301 is read if needed, and is output by the communication software to the communication link 308 through the communication interface 309. The communication software deletes the output data in the MPEG-4 encoded data area of the memory 301.

Next, the encoded data conversion in units of frames in step S100 in the third embodiment is described below with reference to the flowchart shown in FIG. 9.

Figure 9:
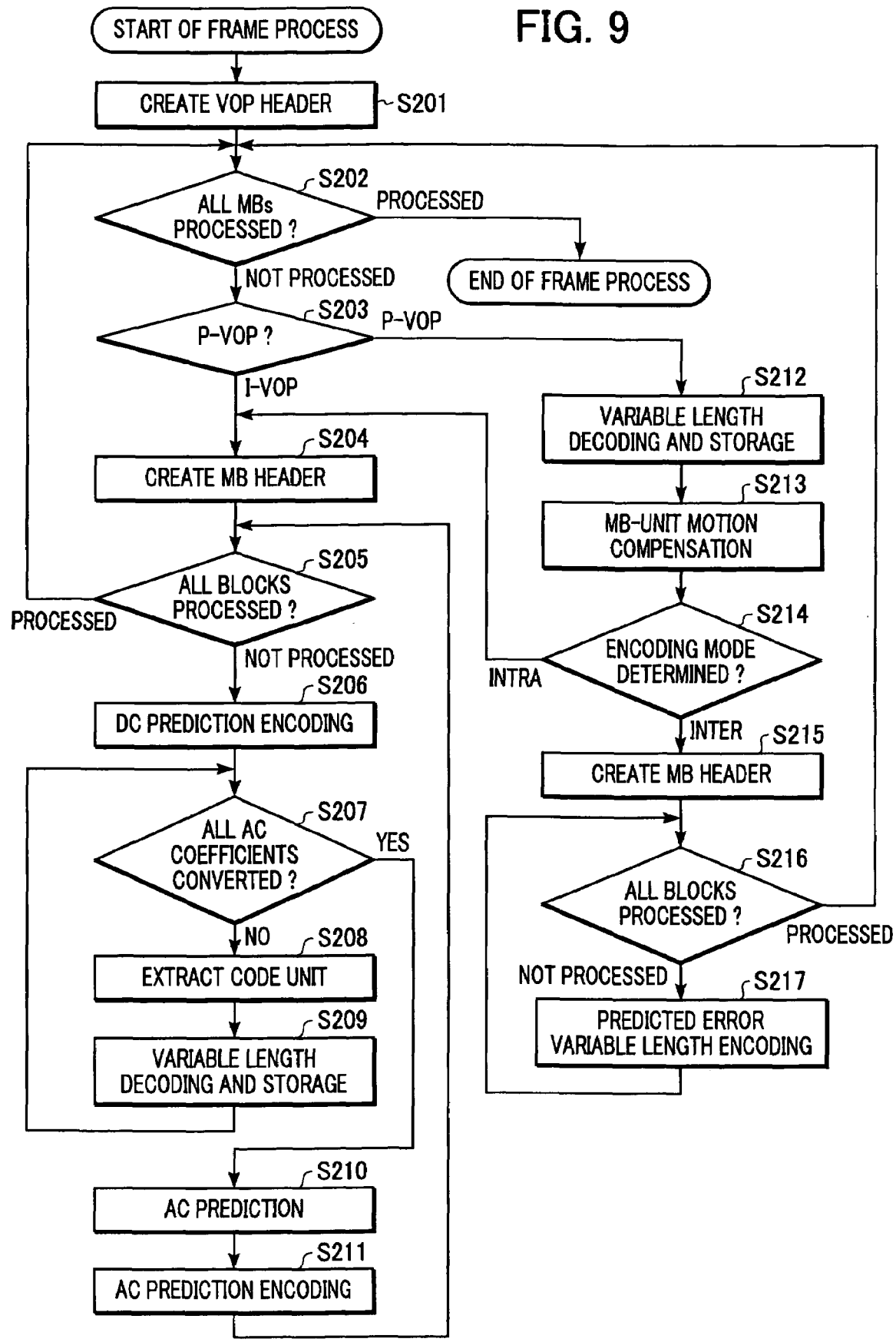
FIG. 9 is a flowchart showing an encoded-data converting process in units of frames according to the third embodiment of the present invention.

Referring to FIG. 9, in step S201, a VOP header is created from the image information and encoding parameters stored in the working area of the memory 301, and the encoding mode determined in step S6 in FIG. 5 is described in a vop_coding_type code. The created VOP header is stored in the MPEG-4 encoded data area of the memory 301. The process proceeds to step S202.

In step S202, it is determined whether or not all the macroblocks of the frame have been processed. If they have been processed, it is determined that the process of the frame ends. If it is not determined, the process proceeds to step S203.

In step S203, a process type is selected depending on the encoding mode determined in step S6. The process proceeds to step S204 when the encoding mode is I-VOP, and proceeds to step S212 when the encoding mode is P-VOP.

When the encoding mode is I-VOP, in step S204, the header of a macroblock as an intra-macroblock is created and stored in the MPEG-4 encoded data area. The process proceeds to step S205. In step S205, it is determined whether or not all the blocks of the macroblock have already been processed. If it is affirmatively determined, the process returns to step S202. If it is negatively determined, the process proceeds to step S206.

In step S206, decoding of a prediction error on a DC component of the block, reproduction of a quantized value of the DC component based on prediction in JPEG encoding, and prediction and encoding in MPEG-4 encoding are performed. The encoded data is stored in the MPEG-4 encoded data area, and the DC component is stored in a corresponding block position in a portion of the working area for storing a quantized value. The process proceeds to step S207.

In step S207, by detecting an EOB code, it is determined whether or not all AC components have been converted. This determines termination of the process in units of blocks. If the AC components have been processed, the process proceeds to step S210. If it is negatively determined, the process proceeds to S208.

In step S208, a Huffman code representing a run length of zero is extracted before the process proceeds to step S209. In step S209, the quantized value is reproduced by decoding the input code, and is stored in a corresponding block position of the portion of the working area for storing quantized values. The process returns to step S207.

When it is determined in step S207 that reproduction of block quantized values ends, in step S210, a DC component and an AC component are predicted in coefficient prediction in MPEG-4 encoding from quantized values of surrounding blocks which are stored in the working area of the memory 301. The process proceeds to step S211.

In step S211, the prediction error and the remaining AC component are encoded and stored in the MPEG-4 encoded data area. The process proceeds to step S205. In step S205, when all the blocks of the macroblock have been processed, the process returns to step S202 in order to process the next macroblock.

Also, when the encoding mode is P-VOP in step S203, in step S212, a quantized value is reproduced by decoding the input macroblock code and is stored in a corresponding block position in the portion of the working area of the memory 301 for storing quantized values. The process proceeds to step S213.

In step S213, motion-vector retrieval in units of 8 pixels is performed by referring to the quantized value in the previous frame which is stored in the working area, and the obtained motion vector and each prediction error are temporarily stored in the working area. The sum $S_m$ of the absolute values of the prediction errors is found before the process proceeds to step S214.

In step S214, the sum $S_s$ of the absolute values of input quantized values, and $S_m$ and $S_s$ are compared with each other. If $S_s$ is less than $S_m$, the process determines that intra-encoding on the macroblock is efficient, and proceeds to step S204. As described above, processing for an intra-macroblock is performed. If not, the process proceeds to step S215 in order to perform inter-encoding.

In step S215, a macroblock header is created for an inter-macroblock for motion compensation, and is stored in the MPEG-4 encoded data area. The process proceeds to step S216. The created header includes encoded data of the motion vector calculated in step S213. In step S216, it is determined whether or not all the blocks of the macroblock have been processed. The process returns to step S202 when it is affirmatively determined, and proceeds to step S217 when it is negatively determined. In step S217, the obtained prediction error is encoded for each block and is stored in the MPEG-4 encoded data area. The process returns to step S202 via step S216 in order to perform processing of the next macroblock.

As described above, the third embodiment is characterized in that a macroblock encoding mode is determined, and AC prediction is performed in the intra-frame encoding mode.

According to the third embodiment, as described above, data encoded by JPEG encoding, which is an intra-frame encoding method, can be converted into data (I-VOP and P-VOP) encoded by MPEG-4 encoding, which is an inter-frame encoding method, without reproducing pixel levels and deterioration. As a result, compared with JPEG encoding, it is expected that, in MPEG-4 encoding, AC prediction greatly increases the encoding efficiency. Also, very high speed processing can be performed since tables can be used for code conversion. It is not necessary to use a memory for storing pixel levels. Thus, the configuration required for processing can be reduced, thus enabling a reduction in apparatus cost. Moreover, the motion-vector retrieval requires a very small number of arithmetic operations, thus enabling a reduction in apparatus cost, and enabling high speed retrieval.

In the second and third embodiments, forward prediction is only used as motion compensation. However, the present invention is not limited to the forward prediction, but another motion compensation mode in MPEG-4 encoding, for example, motion compensation based on bidirectional prediction, may be performed.

In addition, in the first to third embodiments, cases in which JPEG encoded data were used as input and MPEG-4 encoded data were used as output were described. However, the present invention is not limited to these cases, but encoding methods such as MPEG-1, MPEG-2, H.261, and H.263 may be used.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An encoded-data converting apparatus for use with image data comprising:
   a) encoded-data input means for inputting first encoded data encoded with a first encoding;
   b) header extracting means for extracting first header information from the first encoded data;
   c) header generating means for generating second header information for a second encoding from the first header information;
   d) conversion setting means for setting-up variable-length-code conversion based on both a predetermined parameter for use in the second encoding and an encoding parameter used in the first encoding;
   e) frame-data extracting means for extracting encoded data in one frame from the first encoded data;
   f) variable-length-code converting means for converting a variable length code in the encoded data in accordance with the variable-length-code conversion set-up by said conversion setting means;

g) DC-component converting means for decoding DC components in the encoded data in the frame into quantized values and using the quantized values to perform predictive encoding based on the second encoding; and h) encoded-data output means for shaping the second header information and outputs of said variable-length-code converting means, and said DC-component converting means into data, and outputting the data as data encoded by the second encoding.

2. An encoded-data converting apparatus according to claim 1, further comprising:

variable-length-code decoding means for decoding variable length codes in the encoded data in the frame which is extracted by said frame data extracting means;

storage means for storing a decoded result obtained by the decoding of the variable length codes;

motion compensating means for retrieving motion vectors by referring to the decoded result stored in said storage means and calculating prediction errors of the decoded result based on the retrieved motion vectors; and prediction error encoding means for encoding the prediction errors, wherein said encoded-data output means shapes the outputs into the data, including the output of said prediction error encoding means, and outputs the data as data encoded by the second encoding.

3. An encoded-data converting apparatus according to claim 2, wherein said motion compensating means determines which encoding is performed from between intra-encoding and inter-encoding.

4. An encoded-data converting apparatus according to claim 2, wherein said motion compensating means and said prediction error encoding means do not operate when intra-encoding is performed, but operate when inter-encoding is performed.

5. An encoded-data converting apparatus according to claim 4, wherein said prediction error encoding means performs AC predictive encoding when the intra-encoding is performed.

6. An encoded-data converting apparatus according to claim 2, wherein said DC component converting means operates when intra-encoding is performed.

7. An encoded-data converting apparatus according to claim 1, wherein the header information includes image-description information and encoding-parameter information.

8. An encoded-data converting apparatus according to claim 1, wherein said conversion setting means sets a variable-length-code conversion table.

9. An encoded-data converting apparatus according to claim 1, wherein, in the first encoding, only intra-encoding is used, and in the second encoding, adaptive use of intra-encoding and inter-encoding is performed.

10. An encoded-data converting apparatus according to claim 9, wherein the first encoding is JPEG encoding.

11. An encoded-data converting apparatus according to claim 9, wherein the second encoding is MPEG-4 encoding.

12. An encoded-data converting method comprising:

an input step for inputting first encoded data generated by using first encoding to encode image data;

a header extracting step for extracting header information included in the first encoded data;

a header generating step for generating header information based on second encoding from the header information included in the first encoded data;

a conversion setting step for setting-up variable-length-code conversion based on a predetermined parameter for use in the second encoding and an encoding parameter used in the first encoding;

a frame-data extracting step for extracting encoded data in one frame from the first encoded data;

a variable-length-code converting step for converting a variable length code in the encoded data in the frame in accordance with the variable-length-code conversion set-up by said conversion setting step;

a DC-component converting step for decoding DC components in the encoded data in the frame into quantized values and using the quantized values to perform predictive encoding based on the second encoding; and an encoded-data output step for shaping the outputs of said header generating step, said variable-length-code converting step, and said DC-component converting step into data, and outputting the data as data encoded by the second encoding.

13. An encoded-data converting method according to claim 12, further comprising:

a variable-length-code decoding step for decoding variable length codes in the encoded data in the frame which is extracted by said frame data extracting step;

a motion compensating step for retrieving motion vectors by referring to a decoded result obtained in said variable-length-code decoding step and calculating prediction errors of the decoded result based on the retrieved motion vectors; and a prediction error encoding step for encoding the prediction errors, wherein, in said encoded-data output step, the output of said prediction error encoding step is shaped into data, and the data is output as data encoded by the second encoding.

14. An encoded-data converting method according to claim 13, wherein said motion compensating step determines which encoding is performed from between intra-encoding and inter-encoding.

15. An encoded-data converting method according to claim 14, wherein said motion compensating step and said prediction error encoding step are not executed when intra-encoding is performed, but are executed when inter-encoding is performed.

16. An encoded-data converting method according to claim 13, wherein, in said prediction error encoding step, AC predictive encoding is performed when the intra-encoding is performed.

17. An encoded-data converting method according to claim 13, wherein said DC component converting step is executed when intra-encoding is performed.

18. An encoded-data converting method according to claim 12, wherein the header information includes image-description information and encoding-parameter information.

19. An encoded-data converting method according to claim 12, wherein, in said conversion setting step, a variable-length-code conversion table is set.

20. A recording medium containing a program for causing a computer to execute each of steps constituting an encoded-data converting method according to claim 12.

* * * * *